United States Patent [19]

Spishak

[11] Patent Number: 5,407,415
[45] Date of Patent: Apr. 18, 1995

[54] AUTOMATED COMPOSITE TRIM WORKSTATION

[75] Inventor: Noel A. Spishak, Seattle, Wash.

[73] Assignee: The Boeing Company, Seattle, Wash.

[21] Appl. No.: 6,875

[22] Filed: Jan. 21, 1993

[51] Int. Cl.⁶ .............. B23Q 3/157; G05B 19/00; B23D 53/00; B23C 1/16
[52] U.S. Cl. .................. 483/4; 29/563; 83/76.6; 83/368; 83/940; 219/121.82; 364/474.21; 364/474.34; 409/80; 409/202; 483/14
[58] Field of Search ............ 483/7, 14, 15, 4, 5, 483/28; 29/33 P, 563, 564.7; 409/202, 212, 80; 83/936, 937, 938, 939, 940, 76.1, 76.8, 76.6; 219/80, 121.67, 121.78, 121.82, 121.39; 304/474.08, 474.25, 474.34, 474.21

[56] References Cited

U.S. PATENT DOCUMENTS

| | | | |
|---|---|---|---|
| 3,427,518 | 2/1969 | Cloup | 318/18 |
| 4,178,820 | 12/1979 | Gerber | 83/13 |
| 4,686,877 | 8/1987 | Jaritz et al. | 83/177 |
| 4,697,239 | 9/1987 | Sicard et al. | 364/468 |
| 4,702,661 | 10/1987 | Bisiach | 414/460 |
| 4,713,994 | 12/1987 | Guglielmetti et al. | 83/76.6 |
| 4,760,237 | 7/1988 | Mizukado et al. | 219/121.82 |
| 4,821,198 | 4/1989 | Takeuchi et al. | 364/474.21 |
| 4,866,630 | 9/1989 | Beaman et al. | 364/474 |
| 4,920,495 | 4/1990 | Pilkington | 83/940 |
| 4,987,668 | 1/1991 | Roesch | 483/14 |
| 5,088,181 | 2/1992 | Jeppsson | 29/563 |
| 5,091,861 | 2/1992 | Geller et al. | 364/474.34 |
| 5,101,703 | 4/1992 | Tanaka et al. | 83/368 X |
| 5,132,510 | 7/1992 | Klingel et al. | 219/121.82 |
| 5,163,793 | 11/1992 | Martinez | 402/212 X |

FOREIGN PATENT DOCUMENTS 189091 8/1991 Japan .............. 219/121.78

*Primary Examiner*—William Briggs
*Attorney, Agent, or Firm*—Elizabeth F. Harasek

[57] ABSTRACT

An automated workstation is adapted to cut parts of different size and shape from workpieces of flat sheet or molded preforms. A fixtured workpiece is moved into the work area of a preprogrammed cutting robot on a shuttle table. The position of the workpiece to be cut is determined by the robot which cuts it using preprogrammed instructions for the desired part. In a preferred embodiment, a plurality of independently operable shuttle tables are provided so that the robot can work substantially continuously while workpieces are load, unloaded, machined or moved around.

5 Claims, 3 Drawing Sheets

AUTOMATED COMPOSITE TRIM WORKSTATION

This invention relates to a novel automated workstation for trimming and cutting composite workpieces. More particularly, this invention relates to an automated workstation for cutting and trimming airplane parts from composite or metal sheets or preforms, all of which may be very large and have complex contours.

BACKGROUND

Edge trimming composite airplane parts has traditionally been done manually with routers and fixtures adapted for the use of hand tools. The process is generally noisy, slow, labor intensive, tedious, and dirty. Part quality can vary substantially by router operator and many uncontrollable process variables.

In the past, edge trimming of airplane parts has not lent itself to easy automation. The number, size and diversity of parts has frustrated attempts at using available automated trim systems.

For example, U.S. Pat. No. 5,088,181 to Jeppsson, also assigned to The Boeing Company, shows a system for automatically machining airplane parts. However, the system is geared to machining fairly small, flat parts from aluminum sheet. The size of parts that can be machined is limited to an area smaller than the surface area of the machining table. Similarly, U.S. Pat. Nos. 4,920,495, 4,866,630, and 4,178,820 relate to sheet cutting machines where the cutting tool or blade is mounted on a fixture above a limited area work surface and in which the path of the cutting tool can be programmed.

U.S. Pat. No. 4,697,239 relates to a programmable robot which can be moved from location to location, particularly to machine boats. U.S. Pat. Nos. 4,702,661 shows a gantry mounted robot above a fixed workpiece and 3,427,518 shows a digital control system for incrementally moving a workpiece to different workstations along a fixed track.

None of these patents alone, nor any combination thereof, suggests a manufacturing facility for the automated fabrication of sheet stock which may be large sized and or of complex contour.

BRIEF SUMMARY OF THE INVENTION

In accordance with a preferred embodiment of the invention, an automated apparatus is provided that is particularly adapted for the cutting and periphery trim of airplane parts from composite or metal sheets or preforms of such materials.

The apparatus comprises an arm mounted on a gantry above the work area. The arm has an end effector capable of performing the desired cutting or trimming operation and can be moved within the work area defined by the gantry. The position and operation of both the end effector and the arm itself are programmable. A rack is provided within the work area to hold the end effectors.

A sheet to be cut is positioned on a fixture and the fixture is mounted on a shuttle table. The table can be moved within and outside the defined work area, allowing the computer controlled machining of workpieces much larger than the work area. More than one shuttle table is optimally provided to fully utilize the capability of the controlled end effector and machine many different kinds of parts in rapid succession.

To machine one or more parts, the shuttle table is moved into the work area. The position of the table is sensed, and the part to be worked is identified to the machine controller. The arm selects the appropriate end effector from the rack and proceeds to do accomplish the preprogrammed instructions. If the part is too large to be machined all at once, one area of the part is machined and the shuttle table is or may have already been moved to bring the rest of the part into position.

After the operation is complete, the shuttle table is moved out of the work area, the part is unloaded and another part is set in the fixture. Meanwhile, another shuttle table is moved into the work area and the operation is repeated. Therefore, while one part is being machined, other parts on other shuttle tables can be loaded, unloaded, shuttled in or shuttled out.

My invention will be better understood in terms of the several figures and detailed description which follows.

DETAILED DESCRIPTION OF THE INVENTION

Figure 1:
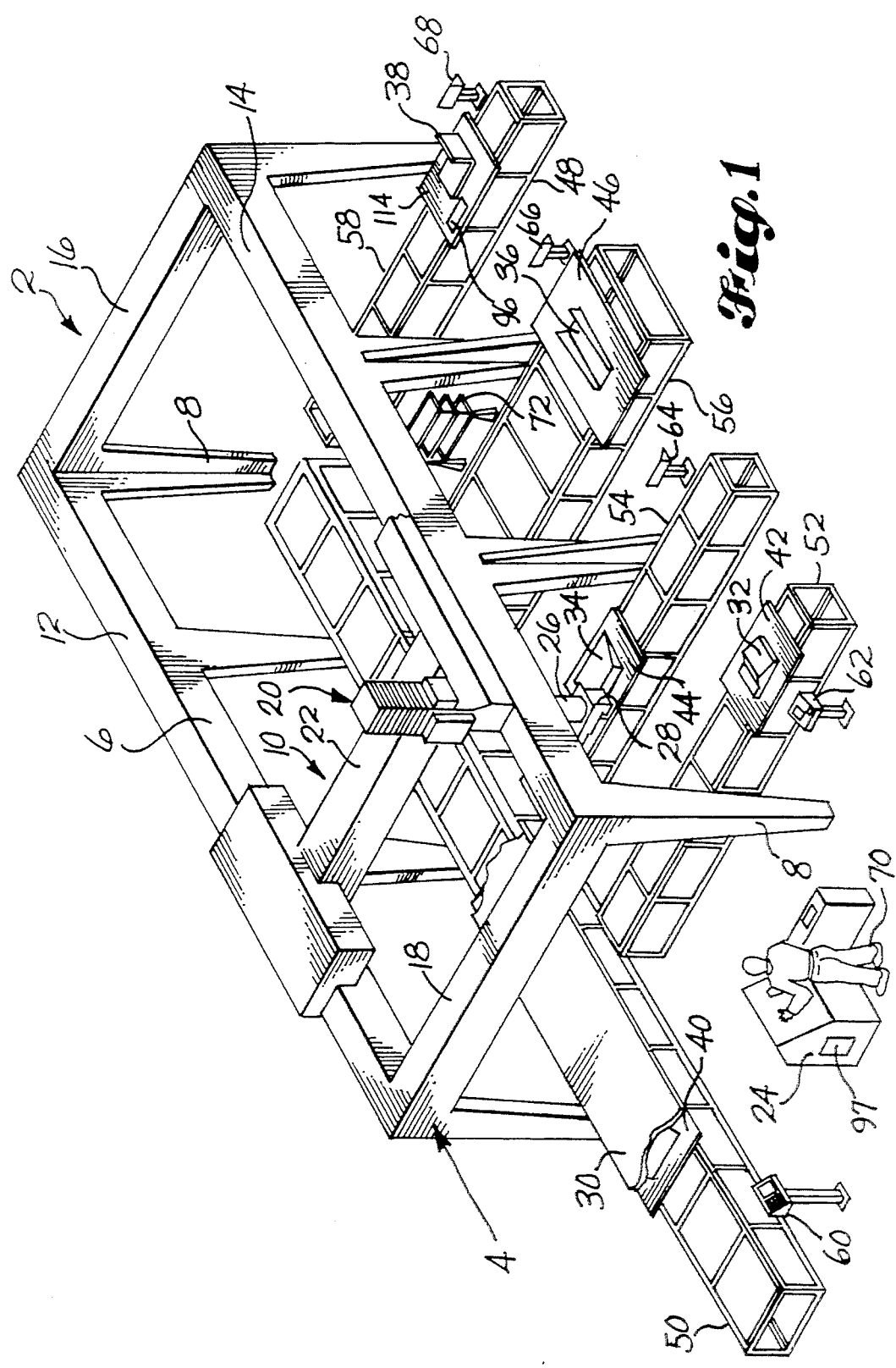
FIG. 1 is a schematic perspective view of an automated workstation in accordance with the invention including gantry, robot, shuttle tables, and computer controls particularly adapted for trimming airplane parts.

In accordance with a preferred embodiment, and with reference to FIG. 1, a schematic perspective view of a workstation 2 for automatically trimming airplane parts of many different sizes, shapes and varieties is provided. Workstation 2 comprises gantry 4 made of steel or other strong material. Gantry 4 has an upper frame 6 and supporting legs 8.

Trestle 10 spans upper frame 6 and travels on rails 12 and 14 between end rails 16 and 18. Programmable robot 20 is mounted on crosspiece 22 and travels back and forth between rails 12 and 14 as directed by computer controller 24. Robot arm 26 is also capable of up and down movement as directed by controller 24. Router end effector 28 is mounted on arm 26. Workpieces 30, 32, 34, 36 and 38 are located on shuttle tables 40, 42, 44, 46 and 48, respectively. These tables can be shuttled back and forth on shuttle frames 50, 52, 54, 56 and 58. Movement of these tables is individually controlled by an operator 70 at control consoles 60, 62, 64, 66, and 68, respectively. In other preferred embodiments the shuttling of pads in and out of the work area defined by a gantry frame could be fully automated.

Movement of robot 20 and its position on trestle 10 and with respect to end rails 16 and 18 is controlled by computer controller console 24. End effectors for robot 20 are stored for pick up on rack 72.

Figure 2:
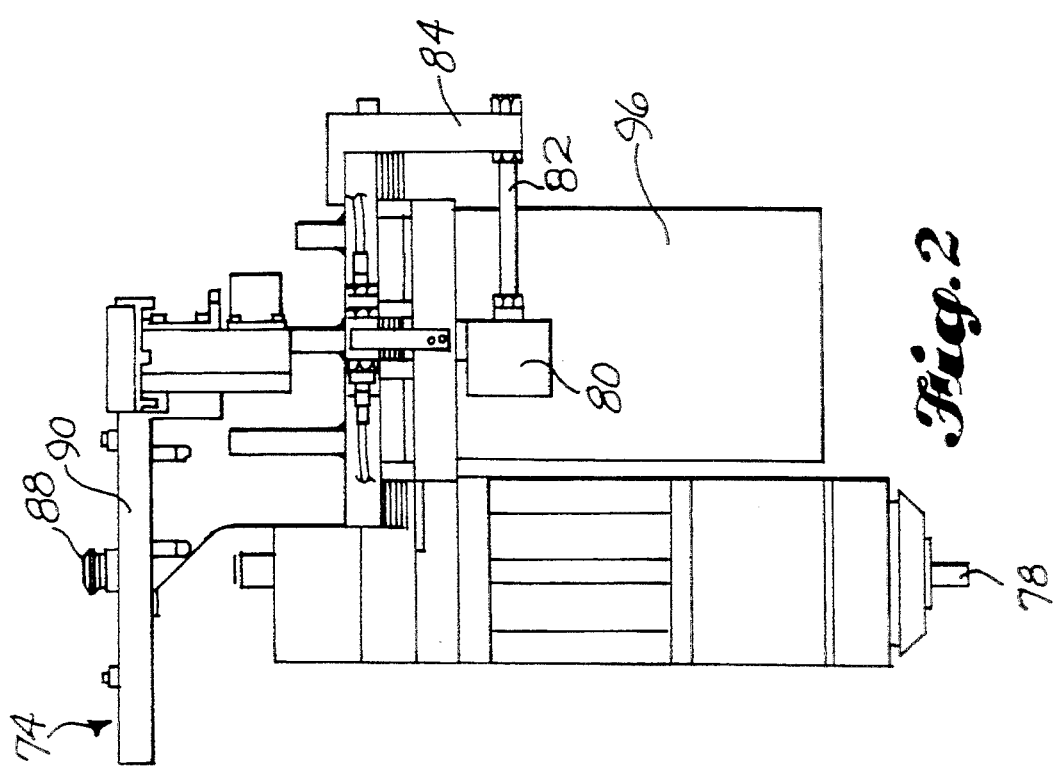
FIG. 2 is a router end effector for trimming the edges of composite sheets from the top and of the type useful in a system as shown in FIG. 1.

FIG. 2 shows a straight router end effector 74 for use with a robot 20. Effector 74 comprises motor 76 which drives router bit 78 at high speeds, preferably about 18,000 rpm for trimming graphite honeycomb composites, through a belt drive transmission (not shown).

Effector 74 features a pneumatic cylinder 80 in which piston 82 fixed to bracket 84 reciprocates as lateral pressure is applied to chuck 86. This feature allows chuck 86 to ride against a fixture edge and locate bit 78 precisely with respect to a workpiece fixture. Effector 74 is picked up by robot 20 by securing lock tab 88 on tool plate 90. A workpiece is routed from the top using straight effector 74.

Figure 3:
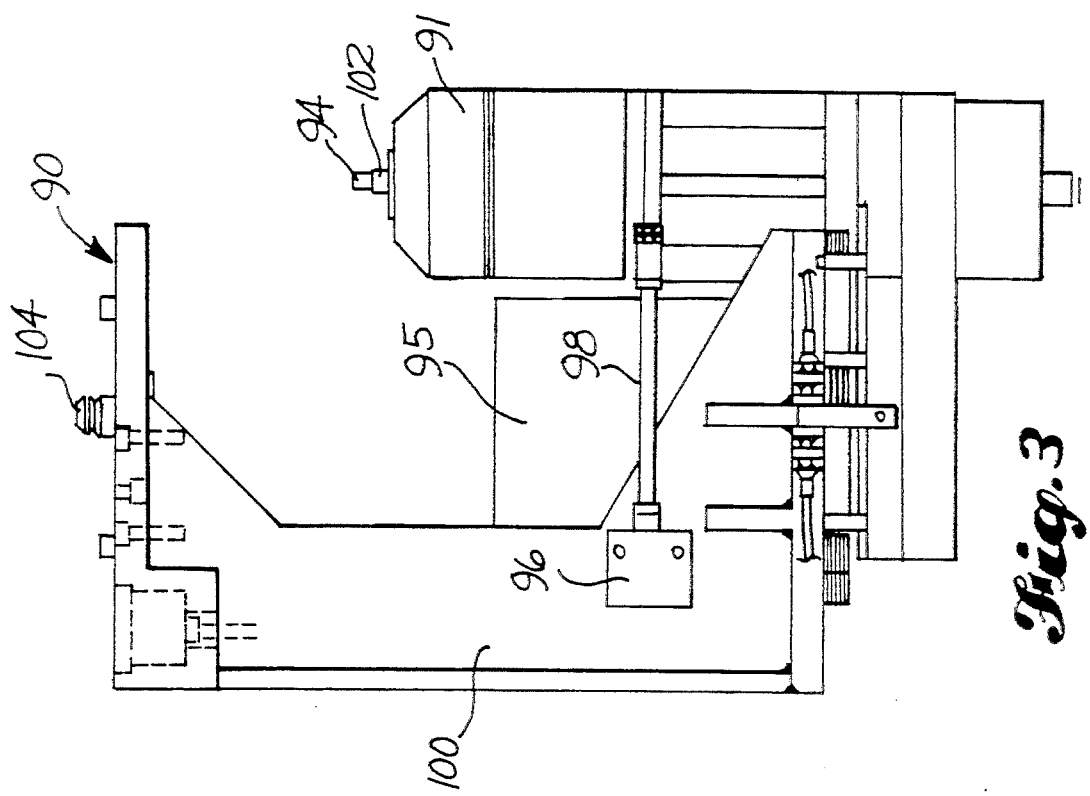
FIG. 3 is a c-frame router end effector for trimming the edges of composite sheets from the bottom and of the type useful in a system as shown in FIG. 1.

FIG. 3 shows a c-frame router end effector 90 for use with a robot 20. Effector 92 comprises motor 93 which drives router bit 94 at high speeds, preferably about 18,000 rpm for trimming graphite honeycomb composites, through a belt drive transmission (not shown) in housing 91. Such c-frame routers 90 are particularly useful for edge finishing rough cut, contoured laminates from their undersides.

Effector 90 features a pneumatic cylinder 96 in which piston 98 fixed to bracket 100 reciprocates as lateral pressure is applied to chuck 102. This feature allows chuck 102 to ride against a fixture edge and locate bit 94 precisely with respect to a workpiece fixture. Effector 90 is picked up by a robot 20 by securing lock tab 104 on tool plate 106.

Figure 4:
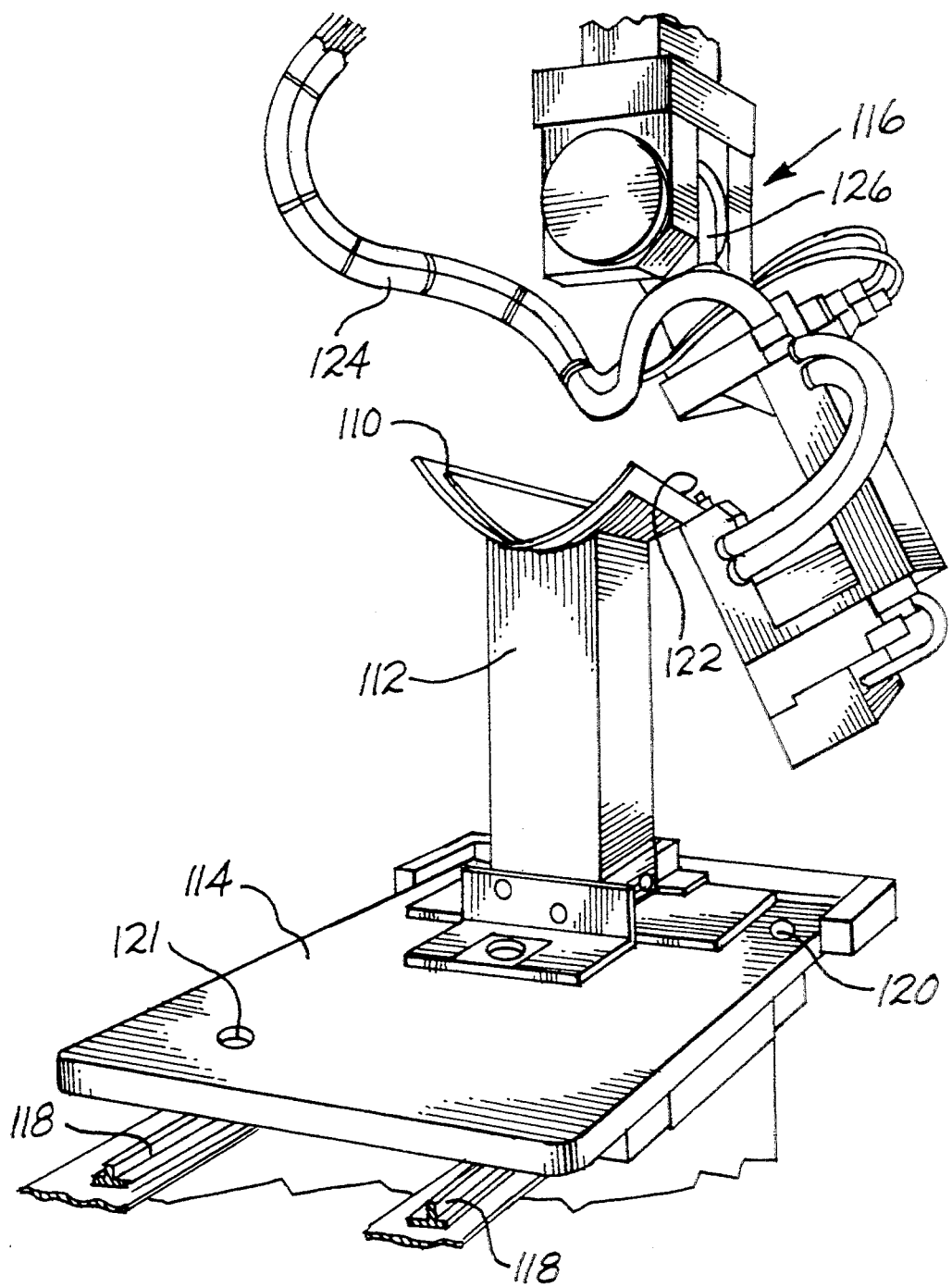
FIG. 4 is a perspective view of an airplane part being trimmed on an apparatus of the type shown in FIG. 1 featuring a shuttle table, fixture, and c-frame router.

The cutting operation of an apparatus in accordance with the invention can be further understood in view of FIG. 4 showing a perspective view of a c-frame router end effector 108 trimming a contoured graphite-honeycomb composite laminate 110 in the context of a system of the type shown in FIG. 1.

Referring to FIG. 4, to edge trim laminate 110, it is positioned on fixture 112. Laminate 110 may be held in position by pulling a vacuum through fixture 112, for example. Fixture 112 is itself located in a predetermined desired position on shuttle table 114 which is indexed into the trimming envelope area of robot arm 116 suspended from a trestle 10 and gantry 4 of the type shown in FIG. 1. Shuttle table 114 travels into trimming position within the envelope on rails 118 under instructions from a controller (60, e.g.) which may be manually operated or preprogrammed.

Once table 114 is in position, an operator enters the part number or other identification into computer controller console 24. This initiates preprogrammed instructions to robot 20. If desired, robot arm 116 may pick up a sensing tool (not shown) from tool rack 72 and exactly locates shuttle table 114, fixture 112 and laminate 110 positions by finding locator indentations 120 and 121 in shuttle table 114. The location of robot 20 and arm 116 are known by controller 60 and so the location of shuttle table 114 is also exactly determined by sensing indentations 120 and 121. Arm 116 returns the sensing tool and picks up c-frame router end effector 108 and trims edge 122 of laminate 110 according to preprogrammed instructions. Debris from the trimming operation is carried away by vacuum in hose 124. It can be seen from FIG. 4, that the edge trimming can be at an angle depending on the articulation to robot arm 116 at joint 126.

Referring to FIG. 1, before a particular workpiece is machined, the shuttle table for it is exactly located as described above and a controller 60 is taught the proper machining pattern. A teach tool, which may be a straight router bit such as 78 shown in FIG. 2, is mounted on an end effector such as 74. The end effector is in turn mounted on a robot arm such as 20, and the teach tool is manually or automatically guided around the edges of a premachined part or template. Controller 60 memorizes the exact location of robot 20 and arm 116 as guided. In a preferred embodiment, the part specific memorized data is identified within controller 60, and a label 96 containing the identification, readable by a portable scanner 97, is affixed to the shuttle table 39 for the workpiece. When a workpiece is positioned on a shuttle table and the table location is fixed as described above, the scanner is used to read the identifying label and the proper machining sequence is initiated by the controller.

In summary, I have invented a workstation that is highly flexible and is capable of cutting and trimming a large number of extremely diverse parts at a high production rate with greater accuracy than can be accomplished by prior art hand trimming processes. The workstation described above was designed particularly to cut and trim laminates of graphite face sheets bonded to honeycomb core. However, the subject apparatus may be used to cut almost any kind of stock of metal, wood, plastic moldings, etc. The workstation can accommodate flat and contoured workpieces and features a programmable robot and routers with compliant spindles that butt up against part fixtures, guided by the robot.

Multiple independent shuttle tables are incorporated to transport parts into and out of the robot work envelope, increasing operations speed allowing parts on different shuttle tables to be simultaneously loaded, unloaded, shuttled in or out or be programmed. Several shuttle tables can effectively serve the more expensive robot machining device. The ability of the tables to shuttle in and out of the work envelope provides for trimming parts such as wing skins which may themselves be longer than the work envelope.

While my invention has been described in terms of specific embodiments thereof, other forms may be readily adapted by one skilled in the art. Accordingly the scope of my invention is limited only commensurate with the following claims.

I claim:

1. An automated apparatus for cutting structural sheets, which sheets may be of large size and complex contour, the apparatus comprising:

a programmable arm having an end effector capable of operating a cutting tool, said arm being mounted on a gantry and said arm having its motion controllable by pre-programmed instructions, said tool operating within a cutting envelope area;

a fixture for a said sheet;

at least one shuttle table capable of carrying a said fixture and sheet and of movement to locate said sheet for cutting in said cutting envelope area;

means attachable to said end effector and cooperating with means on said shuttle table for determining the location of a said shuttle table within said envelope area;

a rack for holding a said cutting tool within said envelope area and from which said arm can select and attach a said tool to said end effector;

means for positioning said arm such that said tool is in position to cut said sheet;

means for on said effector checking the position of a said tool with respect to said sheet to be cut;

means for identifying the desired cutting pattern for a said sheet; and means for using said cutting pattern identity to operate said tool by preprogrammed commands to accomplish cutting in said desired pattern.

2. An automated apparatus for edge trimming composite laminate sheets, which sheets may be of large size and complex contour, the apparatus comprising:

a programmable robot having an end effector capable of operating a cutting tool, said robot being mounted on a gantry and said robot having its motion controllable by pre-programmed instructions, said tool operating within a cutting envelope area;

a fixture for a said sheet;

a plurality of shuttle tables, each said table being capable of movement independent of the other said tables, and of carrying a said fixture and sheet into said cutting envelope area, and of movement within said area to locate said sheet for cutting;

means for attachable to said end effector and cooperating with means on said shuttle table determining the location of a said shuttle table within said envelope area;

a rack for holding a said cutting tool within said envelope area and from which said robot can select and attach a said tool to said end effector;

means for positioning said robot such that said tool is in position to cut said sheet;

means on said effector for checking the position of a said tool with respect to said sheet to be cut;

means for identifying the desired cutting pattern for a said sheet; and means for using said cutting pattern identity to operate said tool by preprogrammed commands to said robot to accomplish cutting in said desired pattern;

means to remove a said shuttle table from said envelope area and to move another said shuttle table into said envelope area to cut another said sheet.

3. An automated apparatus for edge trimming sheets for airplane parts, which sheets may be of large size and complex contour, the apparatus comprising:

a programmable robot having an end effector capable of operating a routing tool, said robot being mounted on a gantry and said robot having its motion controllable by pre-programmed instructions, said tool operating within a routing envelope area;

a fixture for a said sheet;

a plurality of shuttle tables, each said table being capable of movement independent of the other said tables, being capable of carrying a said fixture and sheet into said routing envelope area, and of movement within said area to locate said sheet for routing;

means attachable to said end effector and cooperating with means on said shuttle table for determining the location of a said shuttle table within said envelope area;

a rack for holding a said routing tool within said envelope area and from which said robot can select and attach a said tool to said end effector;

means for positioning said robot such that said tool is in position to route said sheet;

means on said effector for checking the position of a said tool with respect to said sheet to be cut;

means for identifying the desired routing pattern for a said sheet; and means for using said routing pattern identity to operate said tool by preprogrammed commands to said robot to accomplish routing in said desired pattern;

means to remove a said shuttle table from said envelope area and to move another said shuttle table into said envelope area to route another said sheet.

4. The apparatus of claim 1, 2 or 3 further comprising a teach tool used to generate said pre-programmed commands.

5. The apparatus of claim 1 or 2 further comprising (a) said rack located within said cutting envelope area capable of (hold) holding a plurality of end effectors.

* * * * *